C. E. JOHNSON.
UNIVERSAL JOINT.
APPLICATION FILED MAY 7, 1918.

1,310,239.

Patented July 15, 1919.
3 SHEETS—SHEET 1.

Witness:—
Chas. L. Griestauer

Inventor
Carl E. Johnson,
By G. B. McBatt
Attorney

C. E. JOHNSON.
UNIVERSAL JOINT.
APPLICATION FILED MAY 7, 1918.

1,310,239.

Patented July 15, 1919.
3 SHEETS—SHEET 2.

WITNESS:—
Chas. L. Grieshauer

Inventor
Carl E. Johnson,
By E. B. McBath
Attorney

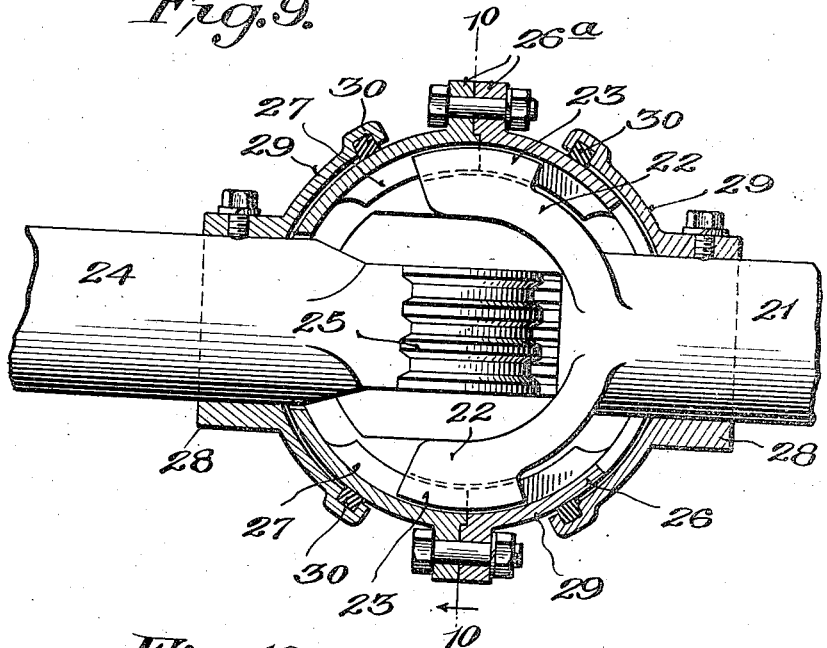
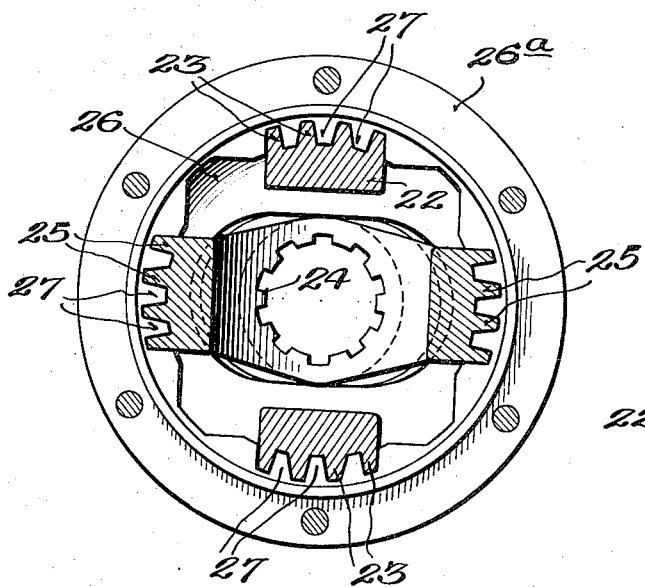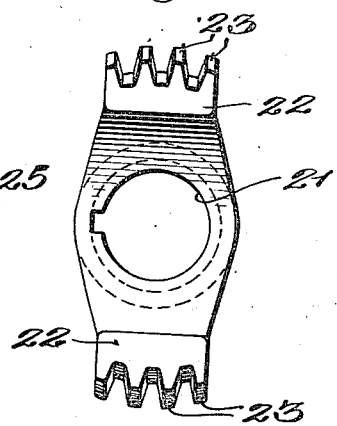

UNITED STATES PATENT OFFICE.

CARL EDWARD JOHNSON, OF ST. PAUL, MINNESOTA.

UNIVERSAL JOINT.

1,310,239. Specification of Letters Patent. Patented July 15, 1919.

Application filed May 7, 1918. Serial No. 233,079.

*To all whom it may concern:*

Be it known that I, CARL EDWARD JOHNSON, a citizen of the United States, residing at St. Paul, in the county of Ramsey and State of Minnesota, have invented certain new and useful Improvements in Universal Joints, of which the following is a specification.

This invention relates to a universal joint having splined driving faces. It is well understood by engineers that the spline fitting is superior to the square type for driving purposes, and this is especially true in automobile work or propelling devices of all types. The spline fitting has superseded the square type for driving purposes and is today the standard type, as it presents a greater amount of bearing surface for the amount of torque imposed upon it, reducing the amount of pressure per square inch to a minimum, and presenting the pressure at right angles to the driving faces thereby insuring longer life and decreased wear on the respective parts.

In my universal joint I have endeavored to incorporate these qualities of the spline drive, thereby producing a joint with a minimum diameter and weight of material, and having a maximum amount of strength and durability.

In its ordinary forms the universal joint is a source of weakness, the joint being weaker than the shafts connected and therefore liable to breakage. This weakness is more marked in the four wheel drive truck than in the two wheel drive, as in the four wheel type it is hardly possible to have all four wheels slip so that the full strain is thrown on the universal joint. This invention is therefore especially adapted for use in connection with the driving of heavy four wheel drive trucks, but its use is not limited to any special place.

The invention consists of the novel features of construction hereinafter described, pointed out in the claims, and shown in the accompanying drawings, in which:

Fig. 9 is a modified form of the joint, shown partly in elevation and partly in section.

Fig. 10 is a section on the line 10—10 of Fig. 9.

Fig. 11 is a face view of one of the yokes shown in Figs. 9 and 10.

Figure 1:
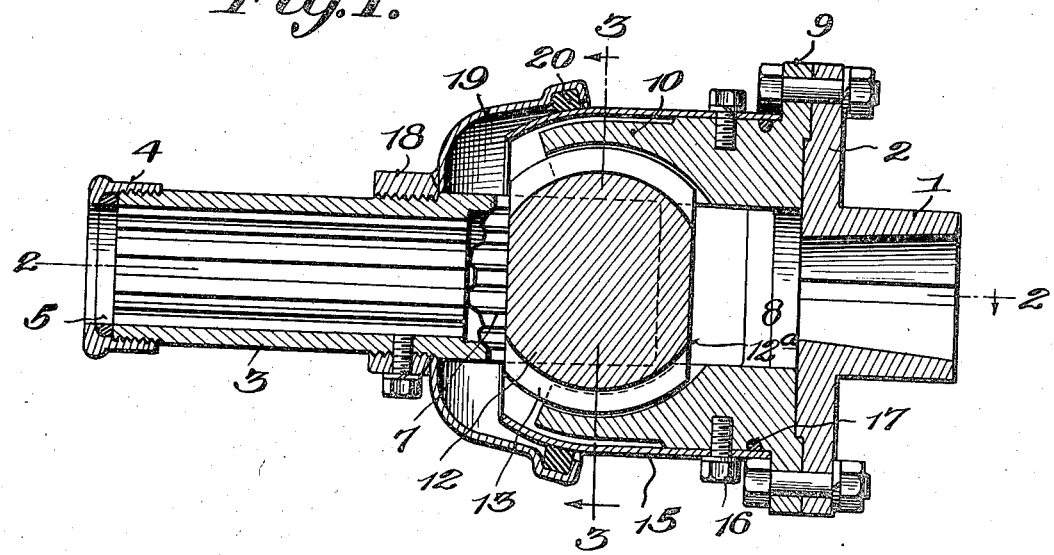
Figure 1 is a longitudinal section through the joint and related parts.
Figure 2:
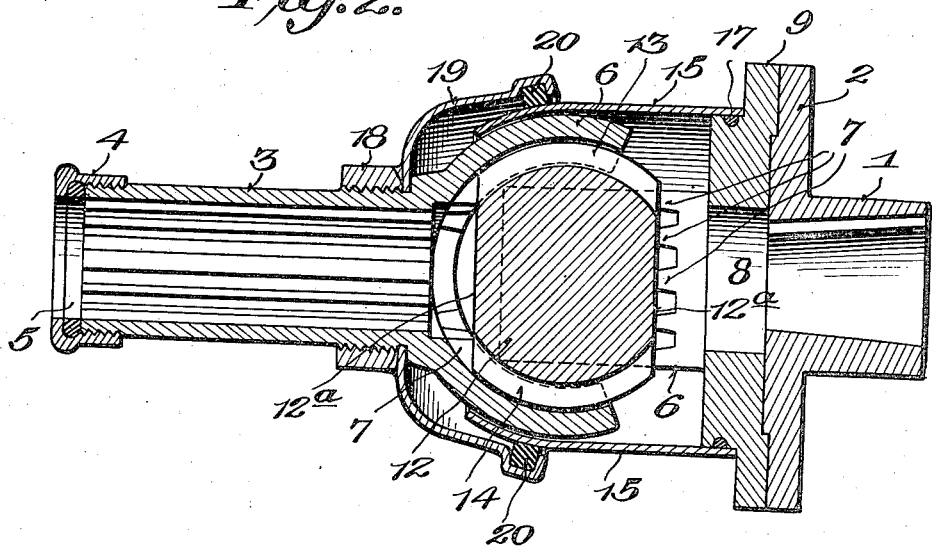
Fig. 2 is a section on the line 2—2 of Fig. 1.
Figure 3:
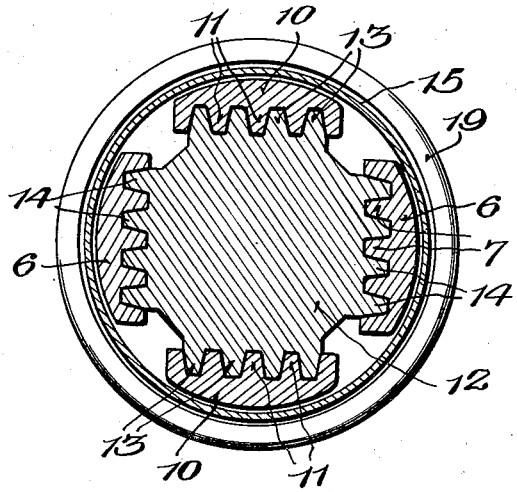
Fig. 3 is a section on the line 3—3 of Fig. 1.
Figure 4:
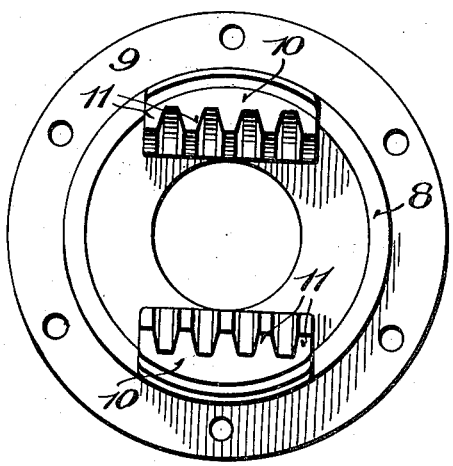
Fig. 4 is a face view of a socket joint.
Figure 5:
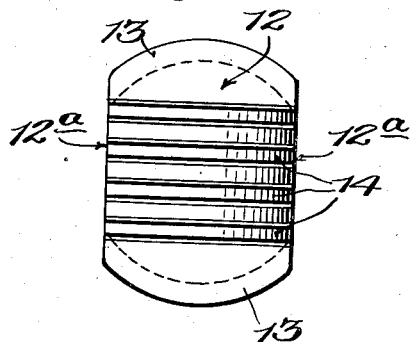
Fig. 5 is a detail view of a spline block, removed from the joint.
Figure 6:
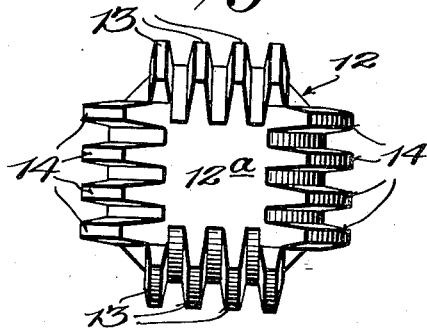
Fig. 6 is a similar view taken at right angles to that of Fig. 5.
Figure 7:
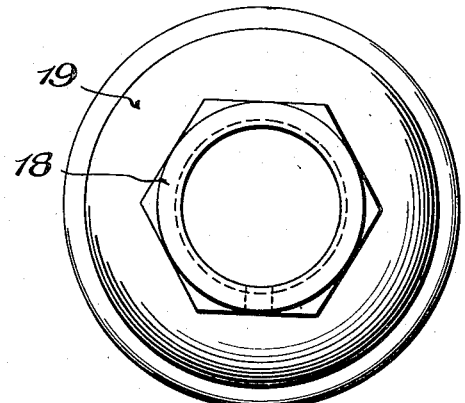
Fig. 7 is an outer face view of a lubricant retaining cap.
Figure 8:
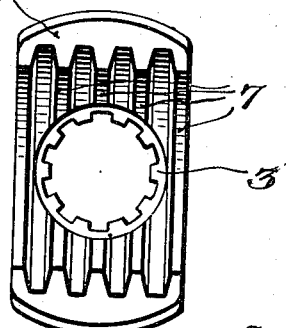
Fig. 8 is a face view of a shaft yoke adapted to coöperate with the socket joint of Fig. 4.

In the above drawings 1 designates a suitable shaft receiving hub having a flange 2. A splined hub 3 is adapted to receive a splined shaft, not shown, and has threaded on it a collar 4 carrying a packing ring 5. The hub 3 carries an integral yoke 6 on the inner face of which are formed keys or splines 7, shown most clearly in Fig. 8.

The socket joint consists of a cylindrical portion 8 having a flange 9 which is bolted to the flange 2 of the the hub 1. It carries two oppositely placed curved yokes 10 which have on their inner faces keys or splines 11 designed in the assembled construction to lie at right angles to the keys of the yoke 6.

The spline block connecting the yokes 6 and 10 and transmitting the power from one shaft to the other is in the form of a spheroid 12 opposite faces of which are cut away as at 12ª so that the block may be inserted into position, and then turned to lock the yoke in place.

On its other four faces are formed beveled keys 13 and 14, there being two oppositely arranged sets of each, one set coöperating with the keys 7 of the yoke 6 and the other set with the keys 11 of the yoke 10.

The yokes are further connected by a shell 15 secured by machine screws 16 to the joint 8 and projecting beyond the yoke 10 and over the yoke 6. A packing ring 17 is carried by this shell adjacent the flange 9. A collar 18 is threaded on the shaft hub 3 and has welded to it a cap 19, bell-shaped and which overlaps the shell 15. This cap is flared to receive a packing ring 20 arranged between the cap and shell. A lubricating chamber is thus formed by the said shell and cap, escape of lubricant being prevented by the packing rings 17 and 20. These parts also exclude dust and dirt from the joint bearings.

Special attention is called to the fact that the keys of the block 12 and those of the yokes 6 and 10 are all cut or formed on an arc concentric with the center of the block 12, so that there is free and easy swinging movement in the joint and at the same time all strains and wear is divided over a large number of keys and a very large bearing surface is obtained compared with the diameter of the joint and the weight of material employed.

In Figs. 9, 10 and 11 I have illustrated a similar universal joint in which the keys or splines are integral either with plain shafts or with splined or tapered shaft fittings. In these figures 21 designates a shaft or shaft fitting, which is immaterial so far as this invention is concerned, and this member carries a yoke 22 the outer end portions of which are provided with keys 23.

A shaft or splined shaft fitting 24 carries a similar yoke with keys 25, designed to lie at right angles to the yoke 22, as in Figs. 9 and 10. These yokes are inclosed within a split ball 26, provided with flanges 26ª for securing the sections of the ball together, and the inner face of the ball sections are provided with keys 27 to coöperate respectively with the keys 23 and 25 of the shaft yokes. Hubs 28 are locked to the shafts and carry caps 29 that partially inclose the ball and which carry the packing rings 30.

The action of this joint and the principle on which it works is substantially the same as the joint previously described.

What I claim is:—

1. A joint of the kind described comprising shafts or shaft fittings having yokes supported thereby and adapted to lie at right angles to each other, beveled keys formed on said yokes, said keys all being on arcs having a common center, a universal joint member having two oppositely arranged sets of beveled keys also struck from the same common center and adapted to engage respectively with the yoke keys, and means for holding a lubricant within and excluding dust from said joint.

2. The combination with shaft members, of yokes carried thereby and lying at right angles to each other when in operative position, each yoke having two sets of beveled keys formed thereon, and means for connecting said yokes, said means comprising two sets of oppositely arranged keys adapted to engage the yoke keys, all of said keys being on arcs having a common center.

3. A joint of the kind described comprising shaft members, yokes carried by the shaft members and having a plurality of keys formed on their inner faces, a spheroidal block cut away on two faces to enter said yokes, and having keys formed on four faces to engage the yoke keys, all of said keys having a common center located in said block.

4. In a joint of the kind described, shaft members, interlocking yokes carried by said members, keys formed on the inner end portions of each yoke, a connecting block arranged loosely in said yokes, four sets of keys formed on four faces of the block and meshing respectively with the yoke keys, a shell carried by and inclosing one of the yokes, and a cap carried by one of the shaft members and overlapping the shell, as and for the purpose set forth.

In testimony whereof I affix my signature.

CARL EDWARD JOHNSON.